Aug. 3, 1926.  1,594,512

E. VON DER LIPPE-LIPSKI

APPARATUS FOR PRESERVING FOODS

Filed June 23, 1924

Inventor

Elaine von der Lippe-Lipski.

Attorney

Patented Aug. 3, 1926.

1,594,512

UNITED STATES PATENT OFFICE.

ELAINE VON DER LIPPE-LIPSKI, OF NEW YORK, N. Y.

APPARATUS FOR PRESERVING FOODS.

Application filed June 23, 1924. Serial No. 721,953.

My invention is an improvement in the art of preserving, and relates more especially to a domestic apparatus for the purpose of preserving foods of all kinds in glass fruit jars by vacuum process.

The primary object of my invention is to provide an apparatus that may be conveniently operated and will facilitate the work of preserving foods for domestic use; the food in the present instance being packed in special jars or containers and placed in a vacuum chamber from which the air is drawn to also exclude the air from the jars containing the food so as to thereby preserve the latter an indefinite period of time.

With this main object in view my invention contemplates the employment of an airtight receptacle, preferably in the form of a bell-jar with a specially formed base, to be used with jars or containers for the food to be preserved, said jars having tops that normally fit loosely on the sealing gaskets and project beyond the body of the jars; all as hereinafter fully described and specifically set forth in the appended claims.

Figure 1:
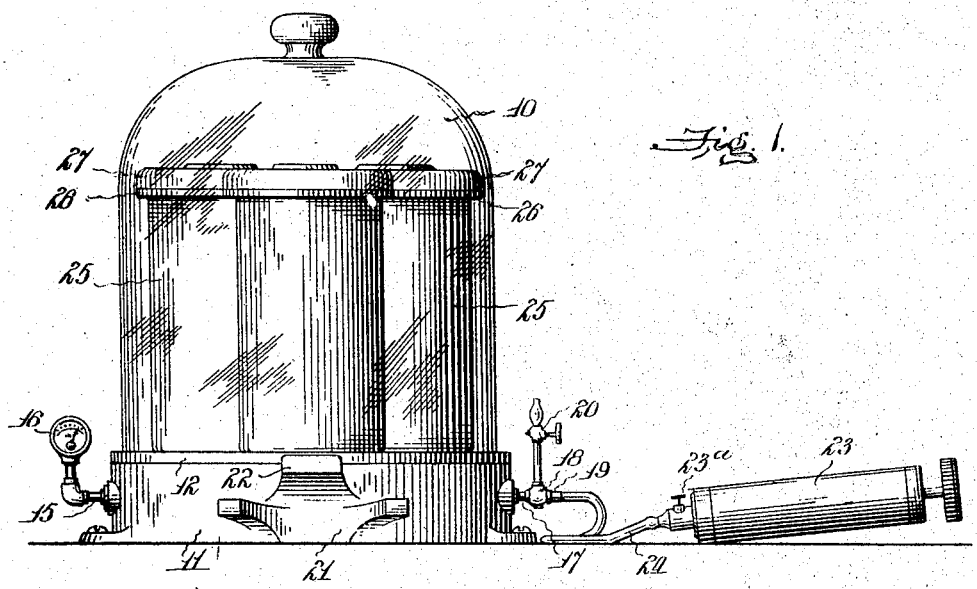
Fig. 1 is an elevation illustrating a preserving apparatus constructed in accordance with my invention.
Figure 2:
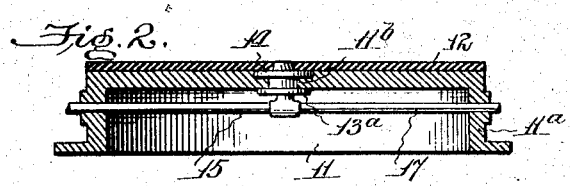
Fig. 2 is a sectional view through the base of the apparatus.
Figure 3:
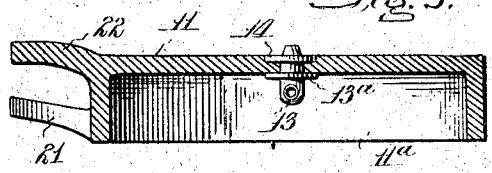
Fig. 3 is a vertical sectional view through one of the jars in which the food is preserved.
Figure 4:
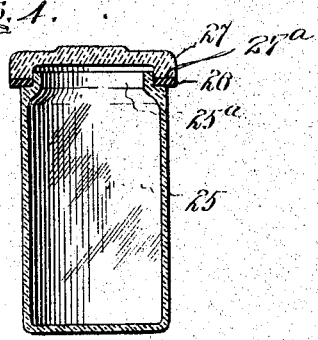
Fig. 4 is a sectional view of the fruit-jar used.

In carrying out my invention I prefer to construct the apparatus after the manner of an ordinary bell-jar, comprising a bell-shaped glass globe 10, a base 11 upon which said globe is mounted, and a rubber disk or packing 12 interposed between the globe and base to provide an air-tight joint; but in the present instance the base is of special construction with a novel arrangement of means carried thereby for withdrawing the air in forming a vacuum, registering the vacuum and for letting out the air, as well as means formed integrally with said base for removing the tops from the jars in which the food is preserved. For these purposes the flat top of the base has a depending flange 11$^a$ around its outer edge and is provided centrally with an opening 11$^b$ to receive a coupling 13 through which the air passes in forming a vacuum in the globe and destroying the vacuum, said coupling being of the three-way type the vertical member of which has an integral horizontal flange or disk 13$^a$ fitting against the underside of the top of the base while the upper part of this member—extending through the opening 11$^b$—is threaded to receive a clamping disk 14 bearing in a recess in the upper surface of the top of the base. The rubber disk or packing 12 is also provided with a central opening, into which the upper end or nozzle of the coupling 13 passes. Connected to one of the horizontal branches of the coupling 13 and extending through one side of the base is a pipe 15 carrying at its outer end a gauge 16, and to the other horizontal branch of said coupling is connected a pipe 17 carrying at its outer end an ordinary three-way coupling 18 with a hose connection 19 and a valve or cut-off 20, the last mentioned elements being located at the opposite side of the base from the gauge. This base is also provided in front with an integral bifurcated member 21 providing a semi-circular recess corresponding in diameter to the body of the jar in which the food is preserved, for the purpose hereinafter explained, and a cooperating member or projection 22 located above and centrally with respect to the aforementioned member.

For withdrawing the air from the globe in forming a vacuum in the bell-jar I may use any type of air-pump or suction pump, as for instance the hand-pump 23 of a conventional type and having a closing valve 23$^a$, and this pump is connected by flexible hose 24 to coupling 18. It will be understood, of course, that instead of a hand pump any other type of pump may be used, as for instance an ordinary form of water power pump such as used in connection with a house-faucet.

As a part of the apparatus, and for automatically sealing the jars or containers which contain the food and are placed within the bell-jar, as well as provide for conveniently removing the tops of said jars, the body of the jar 25 is plain or straight for its full length with an internal annular flange 25$^a$ at its mouth adapted to receive around the same a gasket or rubber ring 26, and in the present instance this gasket or rubber ring is of such width as to project beyond the sides of the jar to cooperate with a removable flat top 27, the latter being of glass or any other suitable material and of the same width or diameter as the external diameter of the gasket whereby said top will also project beyond the sides of the jar. The top 27 is shaped to fit over the flange 25ª at the mouth of the jar and is provided with a smooth lower marginal edge 27ª fitting against the gasket or rubber ring to provide an air-tight joint. It will be understood that the removable top 27 normally fits loosely upon the open-end of the jar and interposed sealing ring so that when said jar is filled with food and placed in the bell-jar the air will be automatically expelled therefrom passing out between the loose top and mouth of the jar, and that when a vacuum is formed in the bell-jar and food-jar and said vacuum later destroyed by admission of air to the bell-jar the top of the food-jar will automatically seal by air-pressure, the vacuum being maintained within the food-jar to preserve the food and also acts to securely hold the top on without extraneous locking means.

From the foregoing description the operation of preserving with my improved apparatus will be readily understood, for the food being packed in jars or containers 25 are then placed in the vacuum chamber and the pump operated to create the required vacuum indicated by the gauge which will also establish a vacuum, preserving the food, in each food-jar, the loose fitting tops of said food-jars permitting the escape of air, and when atmospheric air is admitted to the vacuum-chamber the tops will automatically close on the food-jars and hermetically seal the contents thereof. Food of any kind may be preserved in this manner and will keep an indefinite period of time, and as it is not required to cook the food the entire operation of preserving is very simple and may be readily and conveniently accomplished, thus a very useful household appliance is provided that will facilitate the work of preserving. Furthermore, inexpensive containers or food-jars are also provided with the apparatus, as a part thereof, and by preserving food in these containers or jars in the manner described locking means for the top are not required and said tops may be readily removed by means of the device carried by the base of the vacuum chamber.

Having described my invention, I claim:

1. A household apparatus for preserving food by expelling air from containers in which the food is packed comprising a hollow base having a solid top with a smooth flat upper surface and a central opening through the same, a nozzle secured in said opening by a tight joint and having a pipe coupling member at its lower end, pipes connected to the coupling member and extending therefrom in opposite directions through the sides of the base beyond the latter, one of said pipes being connected to and supporting a pressure-gauge and the other pipe connected to and supporting a valve with an extension for the connection of a vacuum pump to the apparatus; together with a bell-jar, and a disk packing interposed between the bell-jar and top of the base, said disk packing covering substantially the top of the base to cushion the containers.

2. In a household apparatus for preserving food by expelling air from containers in which the food is packed, the combination with a glass bell-jar in which the vacuum is provided, of a metal hollow base having means for attaching the same to a support, a solid top with a smooth flat upper surface and a central opening through said top, a nozzle secured in said opening by a tight joint and having a pipe coupling member at its lower end within the base, and pipes connected to said coupling member and extending therefrom through the sides of the base—one of said pipes carrying a pressure-gauge and the other a valve with an extension forming a connection for a vacuum pump; together with a disk packing fitting the top of the base to receive the bell-jar, said disk packing covering substantially the top of the base to cushion the containers.

ELAINE von der LIPPE-LIPSKI.